(12) United States Patent
Bourdin

(10) Patent No.: US 6,493,823 B1
(45) Date of Patent: Dec. 10, 2002

(54) INSTRUMENT FOR MAKING SECURE DATA EXCHANGES

(75) Inventor: Michel Paul Bourdin, Puteaux (FR)

(73) Assignee: Atos Services, Puteaux (FR)

( * ) Notice: Subject to any disclaimer, the term of this patent is extended or adjusted under 35 U.S.C. 154(b) by 0 days.

(21) Appl. No.: 09/254,270

(22) PCT Filed: Sep. 1, 1997

(86) PCT No.: PCT/FR97/01542

§ 371 (c)(1),
(2), (4) Date: Mar. 3, 1999

(87) PCT Pub. No.: WO98/10563

PCT Pub. Date: Mar. 12, 1998

(30) Foreign Application Priority Data

Sep. 4, 1996 (FR) .............................. 96 10781
May 27, 1997 (FR) .............................. 97 06474

(51) Int. Cl.$^7$ .................................................. G06F 1/24
(52) U.S. Cl. ........................ 713/153; 713/161; 713/168
(58) Field of Search ................................ 713/153, 161, 713/168

(56) References Cited

U.S. PATENT DOCUMENTS 6,104,716 A * 8/2000 Crichton et al. ............. 370/401
6,119,227 A * 9/2000 Mao ............................ 380/278
6,130,623 A * 10/2000 MacLellan et al. ......... 340/10.1

FOREIGN PATENT DOCUMENTS

EP 0675614 10/1995
FR 2608338 6/1988

OTHER PUBLICATIONS

Ferreira R C: "The Smart Card: A High Security Tool In EDP" Philips Telecommunication Review. vol. 47, No. 3, Sep. 1, 1989, pp. 1–19, XP000072642 voir p. 3, ligne 21 p. 4, ligne 19 voir figure 3.

* cited by examiner

Primary Examiner—Thomas R. Peeso
(74) Attorney, Agent, or Firm—Birch, Stewart, Kolasch & Birch, LLP

(57) ABSTRACT

An instrument for making secure messages exchanged between each of the actors of a network having a plurality of actors, each being capable of acting as a sender or as an addressee of a message that is encoded or sealed, the instrument being characterized in that it comprises, for each actor, a respective device ($E_1$) including an integrated circuit with memory zones (2, 3) and a microprocessor (1) capable of executing at least one algorithm and of controlling access to said zones (2, 3) as a function of the nature of the operation requested thereof by the operator holding the device ($E_1$), the operations being selected from the following: encoding (6, 7); calculating a key to be communicated (8); and decoding (9, 10); the memory zones (2 and 3) containing two types of base key that are masked, including a base key ($T_1$) of a first type which is specific to each device ($E_1$), and at least one base key (U) of a second type which is common to all of the devices.

12 Claims, 2 Drawing Sheets

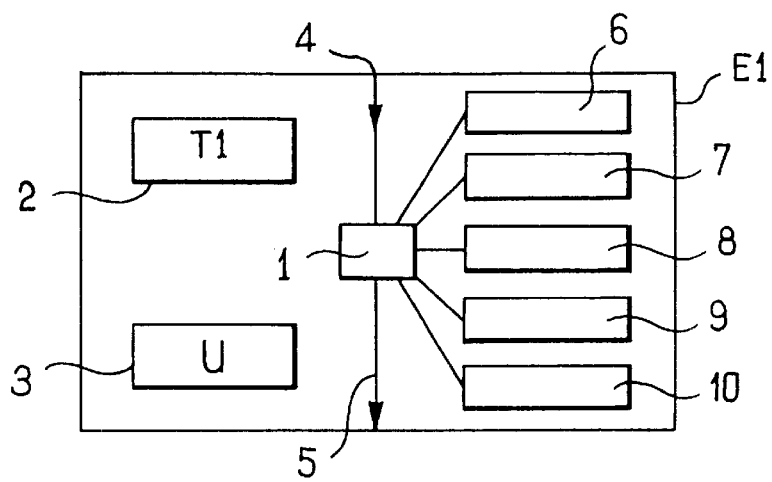
FIG_1
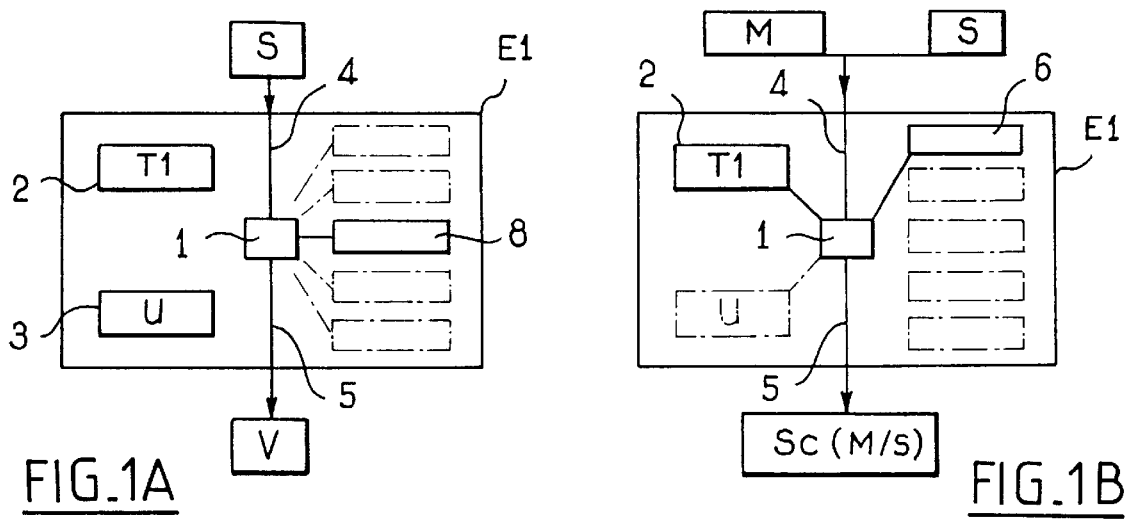
FIG_1A
FIG_1B
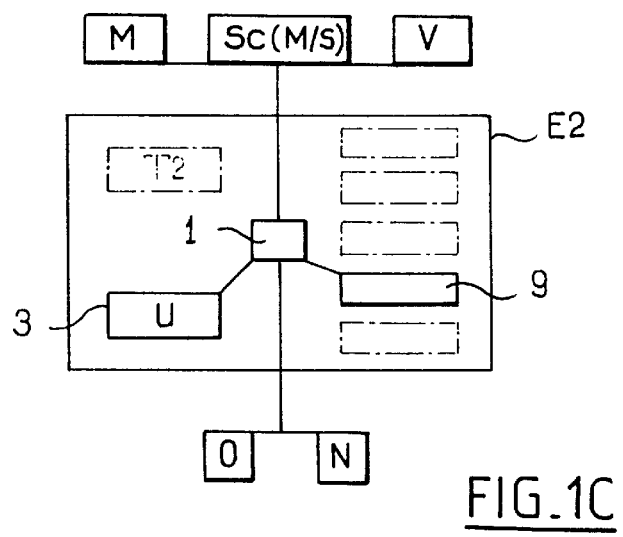
FIG_1C

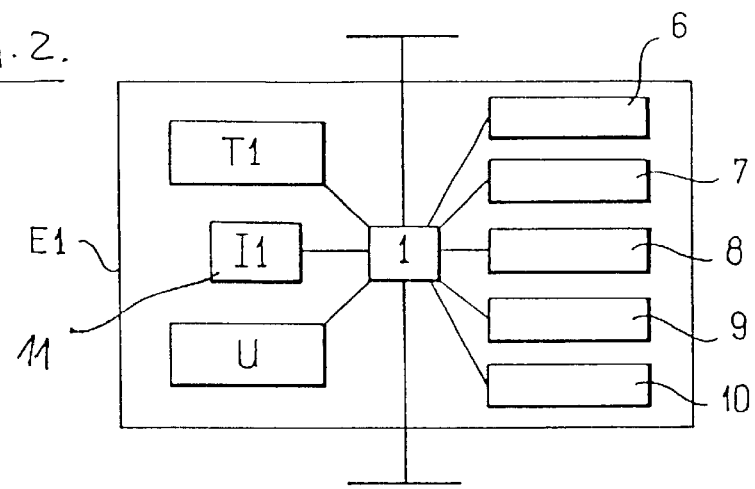
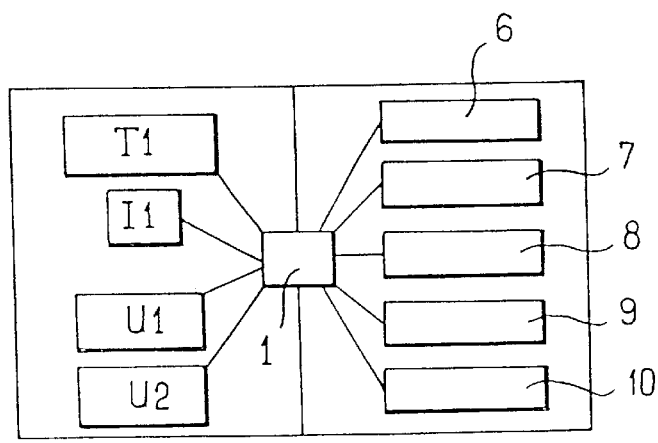
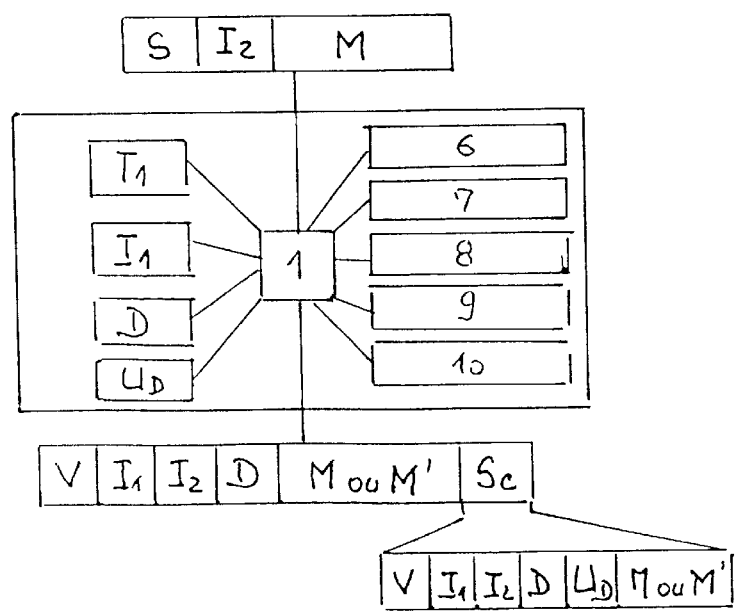

INSTRUMENT FOR MAKING SECURE DATA EXCHANGES

The present invention relates to an instrument for making messages secure, each message having a sender, a receiver, and a content, security being obtained by implementing means, on sending, that enable an encoded indication to be associated with the message to guarantee the authentic nature of the message relative to certain sensitive parameters thereof, and to guarantee the identities of its sender and of its addressee, and on reception, that verify or monitor said encoded indication of the message by using decoding means that match the encoding means used for generating the coded indication.

The coded indication may accompany the content of the message which is readable "in the clear"; in which case the indication can be called a "seal" and the encoding involved is referred to below as "sealing". In other cases, it is the content of the message itself that is encoded, in which case the encoding is called "encrypting", with the information content not being readable in the clear.

It is recalled that sealing or encrypting are known and that they use an algorithm to encode one or more sensitive data items of the message, or the entire message, by means of an encoding key which is personal to the sender.

The seal is checked or decrypted by using an appropriate algorithm and a key which may differ from the encoding key (in which case the algorithm is said to be "asymmetrical"), or which may be the same (in which case the algorithm is said to be "symmetrical").

When the key for checking or decrypting is different from the key for sealing or encrypting, security problems are smaller than in the second case. In this context, it is recalled that security in this field means that it is not possible to counterfeit a sealed transaction message or to read an encrypted message. The degree of security depends essentially on the ease of access to the encoding key. An asymmetrical or irreversible encoding algorithm is more reliable than a symmetrical or reversible algorithm since the encoding key is not disclosed to other actors acting to check or receive the message. Nevertheless, such an algorithm is very inconvenient to implement since it requires lengthy keys to be used and it requires lengthy cryptograms, thereby requiring large amounts of computer power. For a seal, it is generally the practice to add the seal to a message at the time the message is sent. When the message is on a paper medium, decoding requires the message to be keyed in for processing purposes and that is a major source of error and of wrong operation, even when using automatic reader devices.

That is why presently-preferred instruments for making data exchanges secure use symmetrical algorithms (e.g. the data encryption standard or "DES") which require means that are less powerful and therefore less expensive, and which enable relatively short seals and relatively short sealing keys to be used. The drawback of such symmetrical algorithms lies in the same sealing key being possessed by at least two actors, which means that a seal cannot legally be deemed to be a signature since a plurality of actors share the secret and can therefore "seal" or "sign" a message.

There are also risks of fraud when secret keys are transferred or transported, and these risks can be reduced only at the cost of technology that is expensive and complex. This is particularly unsuitable for use when exchanging data that corresponds, for example, to property that is not in material form, and this is a field that is expanding very quickly and where it is necessary to supply an increasing number of users with instruments for making exchanges secure.

The present invention seeks to decrease the risk of fraud as far as possible by proposing an instrument for making secure that is capable of generating encoding/decoding keys that are unknown to the operators who themselves exchange keys that are public, regardless of the role of the operator (sender, receiver, certifier, . . . ).

To this end, the invention thus provides an instrument for making secure by encoding/decoding messages exchanged between each of the actors of a network having a plurality of actors, each being capable of acting as a sender or as an addressee of a message that is encoded or sealed, which instrument comprises, for each actor, a respective device including an integrated circuit with memory zones and a microprocessor capable of executing at least one algorithm and of controlling access to said zones as a function of the nature of the operation requested thereof by the operator holding the device, the operations being selected from the following:

encoding;

calculating a key to be communicated; and decoding;

the memory zones containing two types of base key that are masked, including a base key of a first type which is specific to each device, and at least one base key of a second type which is common to all of the devices.

The first advantage of the instrument of the invention results from this technological feature (i.e. base key values that are masked, with access thereto being via the microprocessor and being selective as a function of the operation allocated thereto). This disposition makes it possible for each microprocessor to implement algorithms that are symmetrical, and therefore fast, while nevertheless creating an overall encoding/decoding (sealing/checking or encrypting/decrypting) system that is asymmetrical, and therefore provides a very high degree of security.

In order to better understand the fundamental mechanisms for processing the various keys as implemented by the invention, the invention is explained with reference to the following application by way of example. The messages to be processed are messages addressed by a sender to receivers. A certain amount of security concerning the authenticity of the message on sending is usually provided by performing the sealing technique. The sender proceeds by encoding certain characteristic data items of the message using a cryptographic algorithm and a key that is specific to the sender. The result of this operation is known as the "seal". The receiver of the message (or the checker) proceeds with seal verification by means of the same key which is applied to the same data that is already known. Using the means of the invention, the sender and the addressees proceed with sealing or with seal verification in entirely conventional manner.

The sender has a device of the invention (e.g. an integrated circuit card) in which a microprocessor possesses two operating modes: a first mode known as "calculate public key" mode where the public key is the key to be communicated, and a second mode known as "calculate seal" mode. The integrated circuit also has memory zones which contain two addresses each containing a masked value (known as a "base" key) that is unknown not only to the bearer of the device but also to the manufacturer. These addresses are accessible by the microprocessor but only when performing particular functions that are to be executed. More precisely, one of the values (first base key T) is accessible by the microprocessor only when executing the "calculate seal" function which is an encoding function, while the other value (second base key U) is accessible only when executing the "calculate public key" function which implements a decoding algorithm.

The actors constituting receivers or addressees of the sealed message also have their own copies of the same device (integrated circuit card) with a microprocessor and memory zones. In a version of the invention that is simplified for explanatory purposes, these memory zones contain, at one address to which access is controlled by the microprocessor, a value that is identical to the second base key U included in the card of the sender, and the microprocessor possesses only a "seal verification" function which is a decoding function. The second base key is naturally unknown to the holder of the card and also to its manufacturer.

In conventional manner, the sender must initially send a key to the receivers to enable them to verify the seals that the sender will put on the messages. For this purpose, the sender selects a key of arbitrary value S which is specific to the sender and which becomes the sender's signature. The sender supplies this signature to the device of the invention in its "calculate public key" mode. The function executed by the microprocessor then consists in encoding said key S by an algorithm A while using the first base key T, and in re-encoding the result obtained by the algorithm 1/A that is the inverse of the algorithm A while using the second base key U. The resulting value constitutes the public key V, which key is to be communicated to each of the receivers.

This can be written algebraically as follows:

$$V=[S(A)T](1/A)U$$

where:
(A)T means that the key S is encoded by the algorithm A while using the key T; and (1/A)U means that the result is encoded by the inverse of the algorithm A while using the key U (which is a decoding operation).

The key V as calculated in this way is transmitted to the receivers.

To seal a message, the sender selects the "calculate seal" function of the microprocessor. The sender inputs the message M that is to be sealed to the device together with the selected signature key S. The microprocessor proceeds to encode the key S by the algorithm A while using the first base key T to obtain the sealing key K. This is written:

$$K=S(A)T$$

which is not accessible to the sender and is used to calculate the seal associated with the message S (written below Sc(M/S)).

The receiver has the device of the invention available and in that device the microprocessor possesses a "verify seal" operating mode and a memory zone that is accessible by the microprocessor only while executing said function, which zone contains the same value U as the second base key of the sender's device.

The receiver, possessing the key V, receives the message (in the clear) and proceeds with verification of the seal associated with the message by selecting the "verify seal" function which is a decoding function that can be executed by the microprocessor of the device held by the receiver. This decoding is performed using the key K which is calculated by the microprocessor while executing seal verification, and this is done on each verification operation without it being possible for the receiver to have any access thereto.

Thus, to obtain the key K, the microprocessor proceeds by encoding the key V by means of the second base key U and the algorithm A. Specifically:

$$K=V(A)U=[S(A)T](1/A)U(A)U=S(A)T$$

The microprocessor of the receiver uses this key to calculate the seal and it gives the receiver the result of a comparison between the value of the seal that it has just calculated and the value of the seal that it has received from the sender.

The above explanation of the various means of the invention and how they are implemented in a basic application illustrate the degree of security obtained in the transaction between a sender and a receiver by means of two masked keys T and U which are accessible only to a microprocessor and even then only in a manner that is selective depending on the function that is being executed by the microprocessor. The masking and this selective accessibility are implemented specifically during manufacture of the memory card and of the integrated circuit so there is no possibility of access being gained by means of any dishonest operation, e.g. by applying software. The device of the invention gives an exchange security of the same degree as an asymmetrical encoding algorithm but with the advantages of a symmetrical algorithm.

In reality, this basic application described above for explanatory purposes gives no more than a glimpse of the possibilities offered by the device of the invention. Thus, other characteristics and advantages appear from the following description of implementations given by way of indication.

Reference is made to the accompanying drawings, in which:

FIG. 1 is a diagram of a basic device of the invention;

FIGS. 1A, 1B, and 1C show the steps as described above relating to sealing a message and to verifying a seal;

FIG. 2 shows a variant embodiment of the device enabling selectivity to be applied to exchanges between actors on a network, enabling message authentication to be reinforced, enabling encrypting/decrypting, enabling a trusted third party or official key depository to intervene, . . . ;

FIG. 3 shows a variant embodiment of the device enabling verification to be reinforced; and FIG. 4 shows another example of how the instrument of the invention can be used.

It is assumed that the device shown in FIG. 1 is a memory card $E_1$ having integrated circuits including a microprocessor 1, a first memory address 2 containing a base key $T_1$ of a first type, i.e. called by the microprocessor while executing an encoding function, a second memory address 3 containing a base key U of a second type, i.e. called by the microprocessor when executing a decoding operation, an input 4 for receiving data to be processed, and an output 5 for delivering processed data. The device also has control means 6 to 10 for selecting the operating mode of the microprocessor from the following five operating modes:

6: seal calculation
7: encrypting
8: public key calculation
9: seal verification
10: decrypting.

The "seal calculation" and "encrypting" operating modes are encoding functions which make use solely of masked keys of the first type T. The "seal verification" and "decrypting" operating modes are decoding functions which make use solely of masked keys U of the second type. The "public key calculation" operating mode is an encoding function followed by a decoding function making use of both types of key in succession.

The memory card is made available to all the actors of a message exchange network, each actor being capable of acting in the network either as a message sender or as a receiver or addressee of a message that has been sent. The only difference between one card and another lies in the value of the base key of the first type $T_1$, $T_2$, etc., which differs from one card to another. This device enables a message either to be sealed or else to be encrypted, with the basic functions that it includes making it possible, as explained below, to satisfy legal requirements that apply to encrypting/decrypting.

FIG. 1A is a diagram illustrating how the public key V is calculated by the holder of a card $E_1$ and which is intended for the holder of a card $E_2$ as shown in FIG. 1C, which card is identical to the card $E_1$ except with respect to its base key of the first type, i.e. the key used by the microprocessor when it proceeds with an encoding operation in its operating mode. This base key is written $T_2$ in FIG. 1C.

FIG. 1B shows how a message M is sealed (how a seal is calculated) in the manner described above.

FIG. 1C shows how a seal is verified by the holder of the card $E_2$ which, acting as a receiver, uses the operating mode 9 of the microprocessor 1 as applied to the information received from the holder of the card $E_1$, i.e. the message M, the seal Sc(M/S), and the public key V, which data is input to the microprocessor 1, and the microprocessor then delivers a "valid" signal O or a "reject" signal N after performing the above-described verification processing.

Since the value of the base key $U_1$ used for a decoding operation when verifying a seal (or when calculating the public key) is common to all of the cards held by the actors of the network, each actor can generate a public key which is specific to that actor and which is usable for decoding purposes by all of the other actors.

Nevertheless, on receiving a public key, an actor is not able to identify the sender of the key.

FIG. 2 shows a variant embodiment of the device of the invention in which it is possible to identify the sender of a sealed message and/or of a public key. The card shown has all of the functions of the preceding card plus a memory zone 11 at which address there is contained a value $I_1$ which is a key for identifying the holder of the card $E_1$. This value is input into the card during manufacture, but it can be extracted by the micro-processor for transmission in the clear. It is therefore not a masked key, unlike the above-described keys T and U.

When a seal is calculated by a sender, this key $I_1$ is taken into account by being concatenated with the message M. The data transmitted to receivers thus comprises the message M, the identity key $I_1$ the calculated seal Sc(MI$_1$/S), and the public key V. The addressee who knows who the sender is by knowing the key $I_1$, that has been received, performs verification of the seal in the manner described above by recalculating the seal on the basis of the message, of the key $I_1$, of a concatenation of the message and the key, while using the key K as calculated from the public key V and the masked base key U. The fact that the key $I_1$, is required in the calculation performed by the microprocessor, without there being any possibility of external intervention, prevents any risk of identity being usurped.

With the invention, it is also possible by transmitting the public key V to the receivers concerned, to seal the key by treating it as a message concatenated with the identity key I. The receivers can thus identify the sender of the key V that they receive, and by verifying the seal they can be sure that the key received is indeed the key from the identified sender.

FIG. 3 shows another variant embodiment in which each card has two masked base keys $U_1$ and $U_2$ of the second type that are common to all of the cards constituting actors of the network. It will be observed that the number of base keys could be multiplied by more than two. The advantage of having two base keys (or more, if need be) lies in the fact that calculating the public key and the function of seal verification require multiple applications of the cryptographic algorithm, thereby greatly complicating cryptographical analysis should that be attempted to discover the key K.

Finally, it should be mentioned that use of the instrument of the invention can be applied universally in secure exchange of data between actors of a network. In another variant embodiment, one of the two (or more) base keys U of the second type is not initially predetermined, but is obtained by calculation based on the identity keys given to each card. In this way, two actors of a network can communicate their identity keys (it is possible to draw up a list of identity keys of the network). The public key of the sending actor is calculated as described above, one of the algorithms implemented using one of the keys of type U that is obtained dynamically from the two identity keys of the actors concerned (the key of the sender being present in a memory of the card, and the key of the addressee being presented to the input together with the signature key S). The public key then becomes usable only by the specified addressee to whom the sender has given his own identity key together with the message and the associated seal. The addressee's microprocessor can then re-establish the dynamic key U by recombining the sender's identity key and its own internal identity key when verifying the seal.

The above description shows that each actor in a network can communicate with all of the other actors, giving them a common public key, or with only one of the other actors by using both the sender's individual identity key and the selected addressee's identity key when generating an addressee public key. The cards can also have other identity keys for establishing subsets of the network, with these keys being common to members of the network who satisfy such-and-such a criterion on which the subset in question is based. Each sender can then generate a public key that is selective on a subset basis.

Amongst other ways of using the instrument of the invention between two actors of the same domain (or subset) of a network, instead of dedicating the public key of the sender actor to a single addressee, the mode of generating a common public key is retained as described above (see FIG. 1A). FIG. 4 shows this example use.

All of the actors in this domain have an instrument E (e.g. a memory and microprocessor card) with, as in FIG. 2, a base key of the first type $T_1$, a first memory zone 11 at which address there is stored the value $I_1$. forming the identity key of the card holder, a second memory zone 12 at which address there is stored a value D identifying the domain, and a base key of the second type UD which is common to all of the cards of the domain D.

In addition to calculating the key V that is to be communicated, the sender of the message uses the instrument to generate a seal Sc which consists in using the key K to encode a message comprising the message M proper (e.g. in the clear), the sender and receiver identifiers $I_1$, $IN_2$, the value identifying the domain D, the unknown value $U_D$ (a base key of the second type), and the key V to be communicated. By including this value $U_D$ in the calculation of the seal, cryptographic analysis of the seal is made impossible since this value is unknown, unlike all the others which, by definition, are known since they are accessible in the clear in the message itself.

In addition, the values $I_1$ and D are placed in the message by the instrument itself, with these values being readable only via the microprocessor by means of a program which restricts free access thereto. It is therefore very difficult to usurp these values.

On receiving such a message accompanied by its signature, the addressee proceeds with verification of the seal which can be performed using the key V, providing the addressee belongs to the same domain as the sender.

It is also possible to transmit a message M' that has been encoded prior to being sealed, with the sealing being performed on the basis of the encoded message.

The addressee can have access to decoding only after the seal has been verified. If such verification is not successful within a determined number of attempts, the decoding function is deactivated and the addressee will be unable to obtain the message M' in the clear.

A message structured as shown in FIG. 4 can include the portion M or M' of a second message which, by way of example, the addressee is to forward to a second addressee. If the first message is encoded, this second addressee will not be able to decode it since decoding can only be performed by the sender or by the first addressee. However, the second addressee can still verify the seal. Thus, in this kind of use, every message is sealed and is thus signed in digital manner. It thus constitutes evidence that can be included encapsulated in some other message.

By using such a message format which is always accompanied by a signature, there is no longer any reason to have a trusted third party. To satisfy legal requirements, it suffices to provide "listening cards" in which the values $I_1$ and D can be placed so as to listen in domain D to messages sent and received by the holder bearing key $I_1$ which is known in the clear, $U_D$ being by definition in the card as is T which is of no use since this "listening card" is not going to send.

The device of the invention thus makes it possible to govern making exchanges of computer data over a network secure (in terms of confidentiality, signature, . . . ) regardless of whether the exchange is of the private type (from one sender to one addressee) or of the public type (one sender to all actors of the network or to certain groups of them). It also makes it possible to completely decentralize procedures for providing security in a given network. Finally, it lends itself to encrypting/decrypting operations since it is capable of satisfying the requirements of order public associated with exchanges of that type.

In a network under consideration, the invention makes it possible to designate an administrator (a trusted third party) who, while using the same means as those of each of the other actors, can, for example, perform the functions of key management, key guarding, and making keys accessible to public authorities in the event of encryption. A seal applied to a public key by the administrator can constitute a certificate that it has been deposited and proof that formalities have been performed in compliance with the legislation in force concerning encrypted messages. In this way, the "encrypting" operating mode of the device of the invention can require the microprocessor which is technologically designed for this purpose not only to receive the encrypting key of the holder (signature) of the device, but also the certificate that the corresponding public key has been officially filed, which certificate will be obtained from the trusted third party. In the presence of the seal and on receiving a request for the "encrypting" mode of operation, the microprocessor may proceed by verifying the seal and then if the verification is successful, by generating authorization to enable the microprocessor to execute the encrypting procedure proper.

What is claimed is:

1. An instrument for making secure messages exchanged between each of the actors of a network having a plurality of actors, each being capable of acting as a sender or as an addressee of a message that is encoded or sealed, the instrument being characterized in that it comprises, for each actor, a respective device ($E_1$) including an integrated circuit with memory zones (2, 3) and a microprocessor (1) capable of executing at least one algorithm and of controlling access to said zones (2, 3) as a function of the nature of the operation requested thereof by the operator holding the device ($E_1$), the operations being selected from the following:

encoding (6, 7);

calculating a key to be communicated (8); and decoding (9, 10);

the memory zones (2 and 3) containing two types of base key that are masked, including a base key ($T_1$) of a first type which is specific to each device ($E_1$), and at least one base key (U) of a second type which is common to all of the devices.

2. An instrument for making secure according to claim 1, characterized in that it has a memory zone (11) that is accessible in reading only an that contains a key (I) identifying the holder.

3. An instrument for making secure according to claim 1, characterized in that it includes a memory zone (12) that is accessible in reading only, containing a key (D) for writing to a domain of the network, the base key ($U_D$) of the second type being common to all of the actors of the domain.

4. A method of calculating a key to be communicated by means of the instrument of claim 1, the method being characterized in that it consists in implementing a first symmetrical encoding algorithm (A) applied to a signature key (S) selected by the actor acting as a sender while using the base key ($T_1$) of the first type, and in implementing a second symmetrical encoding algorithm which is applied to the results of the preceding encoding operation while using at least one base key (U) of the second type.

5. A method of encoding a message by means of the instrument of claim 1, characterized in that it consists in generating an ephemeral encoding key (K) by implementing a first symmetrical algorithm (A) applied to a signature key (S) selected by the actor acting as a sender while using the base key ($T_1$) of the first type, and in implementing a second algorithm applied to at least a portion of the method while using the encoding key (K).

6. A method to decode a message encoded by the method of claim 5, the decoding method being characterized in that it consists in applying, to a key to be communicated (V) as received from the sender of the message, an algorithm that is the inverse of the algorithm used for generating said key while using the key (U) of the second type, and in using the result that is obtained as the key (K) for decoding the message.

7. A method of sealing a message characterized in that it consists in adding to the message, at least a portion thereof encoded by the method according to claim 5.

8. A method to verify a message seal made by the method of claim 7, the verification method being characterized in that it consists in generating the decoding key (K) by the method of claim 6, in encoding at least the above-mentioned portion of said message by means of said key (K), and in comparing the value that is obtained with the value of the seal accompanying the received message.

9. A method of calculating a key to be communicated in accordance with claim 4, the method being characterized in that it consists in the corresponding algorithms using at least one base key of the second type as obtained by the microprocessor making a combination of the identity keys of the two actors concerned by the exchange of messages.

10. A method of sealing a message according to claim 7, the method of sealing a message being characterized in that the seal is made by encoding the message (M), the domain inscription key (D), identity keys ($I_1$, $I_2$) of the two actors concerned by the exchange, and the value of at least one base key ($U_D$) of the second type common to all of the actors of the domain.

11. A method of sealing according to claim 10, characterized in that the message (M) concerned has previously been encoded (M').

12. A method of encoding a message according to claim 5, the method being characterized in that it consists in transmitting the public key to be communicated to one of the actors of the network acting as a trusted third party and in presenting the seal of said public key as calculated by the trusted third party to the instrument, said seal constituting authorization to execute the encoding function.

* * * * *